(12) United States Patent
Mora Vera

(10) Patent No.: US 9,245,462 B2
(45) Date of Patent: Jan. 26, 2016

(54) ADVERTISING SUPPORT FOR SPORTS AND SIMILAR EVENTS

(75) Inventor: Felipe Mora Vera, Valterna-Paterna (ES)

(73) Assignee: PORTIRED, S.L., Valterna Paterna (Valencia) (ES)

(*) Notice: Subject to any disclaimer, the term of this patent is extended or adjusted under 35 U.S.C. 154(b) by 0 days.

(21) Appl. No.: 14/007,021

(22) PCT Filed: May 17, 2011

(86) PCT No.: PCT/ES2011/070352
§ 371 (c)(1),
(2), (4) Date: Sep. 24, 2013

(87) PCT Pub. No.: WO2012/156543
PCT Pub. Date: Nov. 22, 2012

(65) Prior Publication Data
US 2014/0021326 A1  Jan. 23, 2014

(51) Int. Cl.
*A45F 3/44* (2006.01)
*G09F 7/18* (2006.01)
*G09F 7/00* (2006.01)
*G09F 15/00* (2006.01)
*F16M 13/02* (2006.01)
*G09F 19/22* (2006.01)
(Continued)

(52) U.S. Cl.
CPC ............ *G09F 7/18* (2013.01); *F16M 13/02* (2013.01); *G09F 7/002* (2013.01); *G09F 15/0012* (2013.01); *G09F 19/22* (2013.01); *G09F 19/228* (2013.01); *G09F 23/0066* (2013.01); *G09F 17/0091* (2013.01); *G09F 2007/1843* (2013.01)

(58) Field of Classification Search
CPC ............ G09F 7/002; G09F 7/18; G09F 15/00; G09F 19/22; G09F 19/228; G09F 17/0091; G09F 2007/1843; G09F 2007/1834; F16M 13/02; A01K 97/10; E04H 12/2215; E04H 12/2269; A45F 3/44; A63B 2071/026
USPC .......... 248/530, 156, 545, 353, 910; 40/606.01, 607.1, 607.01, 607.03, 40/607.05, 607.06
See application file for complete search history.

(56) References Cited

U.S. PATENT DOCUMENTS

| 931,568 A | * | 8/1909 | Collier ........................... 52/298 |
| 2,520,450 A | * | 8/1950 | Austin, Jr. .................. 248/125.1 |
| 3,079,965 A | * | 3/1963 | Troy ............................... 383/25 |

(Continued)

FOREIGN PATENT DOCUMENTS

| EP | 0083382 A1 | 7/1983 |
| EP | 2277608 A1 | 1/2011 |

(Continued)

*Primary Examiner* — Anita M King
(74) *Attorney, Agent, or Firm* — Jacobson Holman, PLLC.

(57) ABSTRACT

The support comprises a frame (1) with the general shape of a U with two uprights (11,12) and a crossmember (13), plus a printed sheet (2) secured to the frame; the frame comprises a solid core (14) and a tubular sleeve (15) covering the core, which comprises at least a natural or synthetic rubber. The support is prevented from being bent over by the wind or in the event of high temperatures, or from being deformed; damage is also avoided in the event of an impact against the support. The production method comprises providing a perforated fabric or mesh (2), roller-printing thereof, curing thereof in an oven at a temperature of at least 100° C. to obtain a highly flexible, high strength material, and printing or painting the required advertising motifs thereon.

1 Claim, 2 Drawing Sheets

(51) Int. Cl.
*G09F 23/00* (2006.01)
*G09F 17/00* (2006.01)

(56) References Cited

U.S. PATENT DOCUMENTS

| | | | | |
|---|---|---|---|---|
| 3,824,141 | A * | 7/1974 | Miller et al. | 156/143 |
| 4,497,077 | A * | 2/1985 | Provost | 4/628 |
| 4,817,319 | A * | 4/1989 | Vitale | 40/610 |
| 4,866,866 | A * | 9/1989 | Rotter et al. | 40/610 |
| 5,082,231 | A * | 1/1992 | Knowles | 248/545 |
| 5,271,196 | A * | 12/1993 | Fanti | 52/166 |
| 5,348,291 | A * | 9/1994 | Scully | 473/454 |
| 5,518,803 | A * | 5/1996 | Thomas | 428/195.1 |
| 5,622,108 | A * | 4/1997 | Benedetto et al. | 101/126 |
| 6,446,930 | B1 * | 9/2002 | Li | 248/519 |
| 6,712,118 | B2 * | 3/2004 | Nussdorf | 160/351 |
| 6,892,486 | B2 * | 5/2005 | Haggard, Jr. | 40/604 |
| 7,150,690 | B1 * | 12/2006 | Cusick | 473/478 |
| 8,257,205 | B2 * | 9/2012 | Mora Vera et al. | 473/478 |
| 2002/0100247 | A1 * | 8/2002 | Lai | 52/742.14 |
| 2004/0169121 | A1 * | 9/2004 | Winn | 248/530 |
| 2006/0143960 | A1 * | 7/2006 | Gnas | 40/607.01 |

FOREIGN PATENT DOCUMENTS

| | | |
|---|---|---|
| ES | 1063607 U | 11/2006 |
| ES | 2346125 A1 | 10/2010 |
| GB | 2343633 A | 5/2000 |
| WO | 2007/096435 A1 | 8/2007 |
| WO | 2009/138543 A1 | 11/2009 |

* cited by examiner

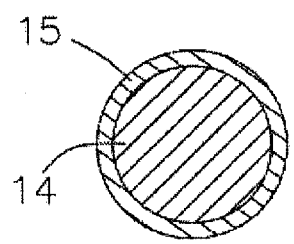
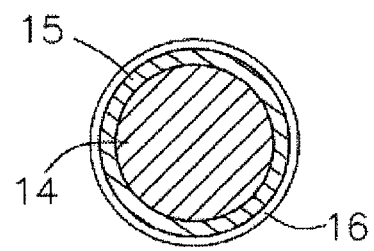
Fig. 3    Fig. 4
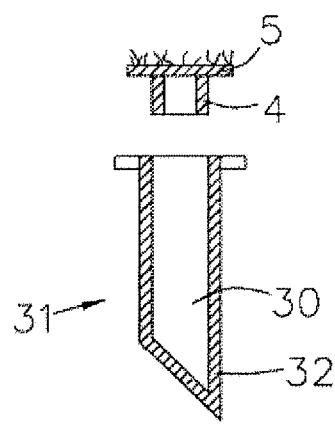
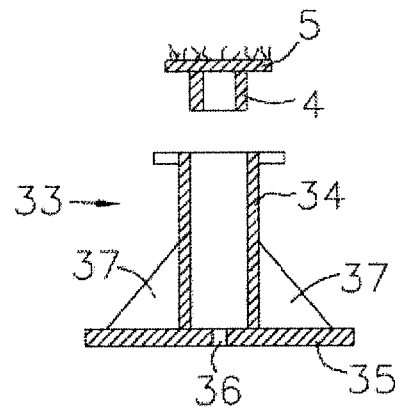
Fig. 5a    Fig. 5b

ADVERTISING SUPPORT FOR SPORTS AND SIMILAR EVENTS

This is a national stage of PCT/ES11/070352 filed May 17, 2011 and published in Spanish, hereby incorporated by reference.

The present invention relates to an advertising support for sports and similar events, designed to be placed, for example, in football pitches and similar, of the type comprising a frame with the general shape of a U plus a printed sheet with advertising which is secured to the frame.

It also relates to a method for producing the support.

PRIOR ART

Advertising supports are known designed to be placed for example in football pitches and similar, on both sides of the goalposts. The advertising is visible by the public and is also captured by the television cameras when there is play close to the goalposts.

These supports have at least a certain degree of flexibility to avoid damages if a player collides with them; and they may have logos or advertising messages without jeopardizing the view of spectators, photographers, television cameras, etc.

To avoid damages in the event of impact against the support, it has been proposed, for example, in the utility model ES1063607U, to manufacture the entire support frame in a flexible material, such as a rubber. Another solution, known for example through patent WO2009/138543, is to make the support collapsible, coupling springs in the base of the frame uprights.

Although these solutions have been satisfactory in many cases, some drawbacks have already arisen in practice which mean that the known supports may lose or see their advertising function reduced: for example, the supports may tilt when there is a relatively strong wind, or the frame may deform when the temperatures are high, or when they are subjected to certain stresses.

EXPLANATION OF THE INVENTION

The present invention proposes an advertising support, which resolves said drawbacks at least in part.

In accordance with the invention, the advertising support for sports and similar events comprises a frame with the general shape of a U with two uprights and a crossmember, plus a printed sheet which is secured to the frame, and is characterized in that the frame comprises a solid core and a tubular sleeve covering the core, with the sleeve comprising at least a natural or synthetic rubber.

This structure provides the frame, and the advertising support as a whole, with very suitable properties: on the one hand, it avoids the support from tilting or bending due to the wind or high temperatures, or that it is deformed in the event of an impact; and, at the same time, it avoids the players and other people from suffering any injuries if they collide with the support. It also buffers the impact in the event that a ball impacts against the support so that it reduces the risk of the ball bouncing towards the pitch.

Preferably, the frame is of a plastic material which has bakelite as the predominant component; and advantageously further comprises melamine resin, epoxy resin, polybutadiene and polyesters.

The covering sleeve, for its part, preferably comprises natural rubber, neoprene and polybutadiene.

In embodiments of the invention, the free ends of the frame uprights are surrounded by tubular PVC terminals.

In accordance with some embodiments, the support further comprises two fixing bases, each one of which comprises a tubular part which defines a cavity appropriate for receiving the free end of an upright of the frame; it is possible to associate a cap to each tubular part, optionally equipped with a trim, when the support is removed from the fixing bases.

In an embodiment, the tubular part of the support bases is formed as a pick suitable for driving into the ground and suitable for being removed when the advertising support is not in use.

Alternatively, the tubular part is fixed to a plate for its permanent installation in the ground.

In accordance with another alternative, the tubular part is fixed to a support base on a surface, with the base being equipped with a weight appropriate for the stability of the advertising support.

Preferably, the printed sheet comprises a perforated fabric or mesh, with means of securing to the frame.

In an embodiment, the printed sheet comprises two layers, joined together by at least three sides which coincide with the uprights and the crossmember of the frame, with the frame being positioned between the two layers.

In embodiments of the invention, the core of the frame has a rounded section with a diameter of between 10 and 20 mm, and the tubular sleeve of the frame has an outer diameter of between 15 and 40 mm.

It is possible to insert in the frame any type of advertising susceptible of being printed, screen-printed, embossed, painted or of any other mode or form.

In another aspect, the present invention also relates to a production method of an advertising support, which is characterized in that it comprises the stages of:
  providing a perforated fabric or mesh;
  roller-printing the fabric or mesh;
  curing in an oven at a temperature of at least 100° C. to obtain a highly flexible, high strength material; and
  printing or painting the desired advertising motifs on the fabric or mesh.

This process makes it possible to give the sheet highly resistant properties and, at the same time, highly flexible.

BRIEF DESCRIPTION OF THE DRAWINGS

Embodiments of the invention shall be described below, with reference to the attached drawings, which only have the character of non-limiting examples to help towards understanding of the present invention:

FIG. 3 is a cross-section view of the frame, taken along line of FIG. 2;

FIG. 4 is another cross-section view of the frame, taken along line IV-IV of FIG. 2;

FIGS. 5a and 5b show two possible embodiments of the fixing bases to mount the support.

DETAILED EXPLANATION OF THE EMBODIMENTS

FIGS. 1 to 4 show an advertising support in accordance with an embodiment of the invention. As can be observed, the support comprises a frame 1 and a sheet 2, of perforated fabric or mesh, printed with advertising and secured to the frame 1;

furthermore, bases 3 are provided to fix the support in a football pitch or on any other surface.

The measurements of the support may vary: a suitable support may be, for example, of approximately 120×70 cm.

Figure 1:
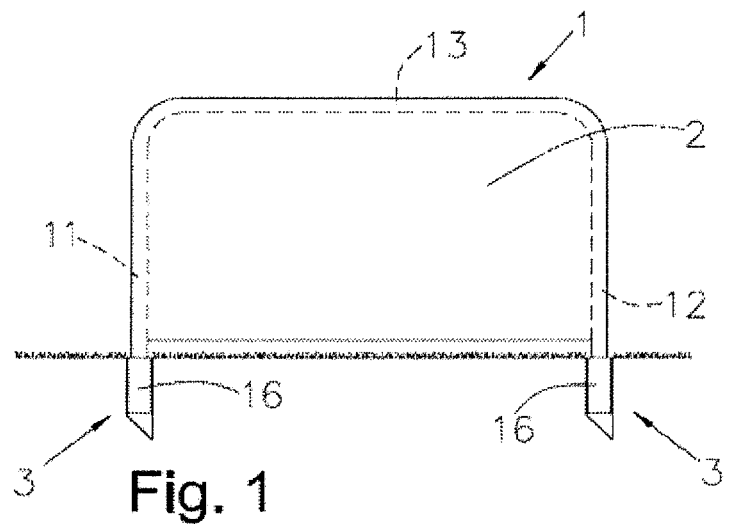
FIG. 1 is an elevational view of an advertising support in accordance with a specific embodiment of the invention, placed in a football pitch.
Figure 2:
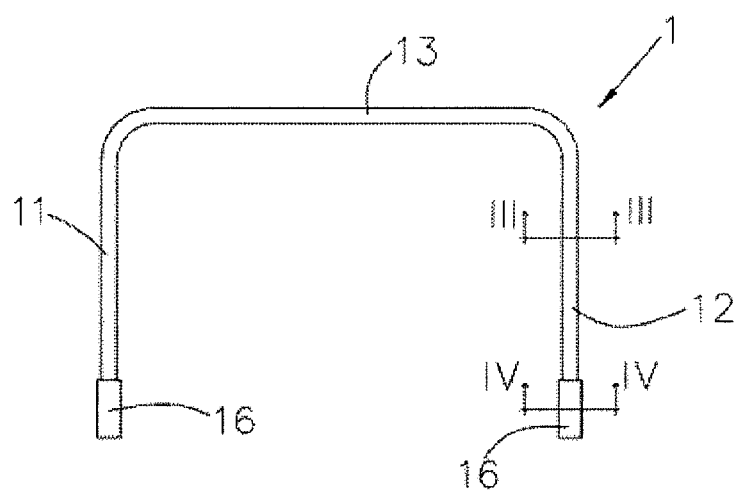
FIG. 2 is an elevational view, partially cut, of the armature or frame of the advertising support of FIG. 1.

The structure of the frame 1 in accordance with an embodiment of the invention is shown in FIGS. 2 to 4. The frame has two uprights 11, 12 and a crossmember 13, configured in the general shape of a U, and comprises a solid core 14 surrounded by a tubular sleeve or cover for covering 15 (see section in FIG. 3).

The core 14 of the frame 1 may be made from a plastic material which comprises melamine resin, epoxy resin, polyesters, polybutadiene and bakelite, this latter component being the predominant one. This composition gives it a suitable resistance to withstand any impact. The core is generally manufactured by moulding and in a single part; it can be polished after its extraction from the mould, to eliminate the impurities that may remain on its surface.

The material of the core is suitable to allow the frame of the support to temporally give when it receives bumps and other stresses and return to its original form without ever permanently deforming.

A range of compositions that offers the frame core the suitable mechanical properties, flexibility and, at the same time, resistance to permanently deforming is, for example, the following:
bakelite 30% to 50%
melamine resin 15% to 25%
polybutadiene 15% to 25%
epoxy resin 7% to 13%
polyester 7% to 13%

These proportions of the materials are applicable with any configuration of the frame in accordance with the invention, irrespective of its measurements, geometric form, manner of fixing to the ground, etc.

The sleeve 15, for its part, can be made from a mixture of natural rubber, neoprene and polybutadiene, which give it a very appropriate elasticity to buffer any bump that the support may receive: in this way it minimizes the risk of injuries in the event of a player or any other person colliding with the support and also hinders the ball from bouncing and returning to the field in the event of an impact against the support.

In accordance with an embodiment, which is also applicable to any configuration of the frame, the composition of the sleeve 15 can be the following:
Natural latex 25% to 35%
neoprene 25% to 35%
polybutadiene 30% to 50%

The sleeve slides over the core manually, or using an appropriate tool.

This structure of the frame 1, with an inner core 14 and an outer sleeve 15 of different materials and properties, gives it resistance to impacts of any type, so that it avoids any deformation by the wind or by impacts, guaranteeing it meets its advertising function reliably and at the same time it gives flexibility so that it is not a danger or annoyance for the game.

The solid core may have a diameter of between 10 and 20 mm, for example approximately 15 mm, whilst the tubular sleeve may have a similar inner diameter or slightly greater than the core diameter, so that it can be comfortably inserted thereon, and an outer diameter of between 15 and 40 mm, for example approximately 25 mm.

In the area adjacent to the free end of the uprights 11 and 12, rigid tubular terminals 16 are coupled, surrounding the rubber sleeve (see FIG. 2 and the corresponding section in FIG. 4); these terminals 16 can be made of PVC and can be fixed to the uprights by screwing, riveting, gluing, etc.

The presence of the terminals 16 avoids the sleeve 15 from sliding and coming out of the core and also protects the sleeve from friction, wear, etc. in the fixing area. As shall be seen further on, when the support is placed in its position of use the terminals 16 are largely, or preferably totally, concealed.

It is possible to insert in the frame 1, using the printed sheet 2, any type of advertising susceptible of being printed, screen-printed, embossed, painted or of any other mode or form.

Thus, the sheet 2 with the desired advertising motifs is secured on the frame, in general above the terminals 16 and up to the crossmember 13; the base of the sheet may be a cotton or nylon cloth, pressed and filled with holes to form a perforated fabric or a mesh which allow the passage of air.

In accordance with an embodiment, the manufacturing of the printed sheet may include the stages of:
placing the mesh or perforated fabric under tension in a working frame to be able to work on it;
applying to it a primer with a very thick special paint using rollers;
introducing the mesh or perforated fabric in an oven with a belt at a temperature of at least 100° C., and performing several runs of around 10 minutes each one, until achieving an elastic and resistant mesh; and
painting the logotypes or advertising messages on the mesh or perforated fabric using highly durable acrylic paints suitable for extreme temperatures, for example, using laser-cut methacrylate templates; joining two layers with the suitable form on three sides, coinciding with the uprights 11,12 and the crossmember 13 of the frame 1.

This two-layer sheet shall be fastened to the frame so that the crossmember 13 and the longer part of the length of the two uprights 11 and 12 are placed between the two layers of the sheet; this can be done in any suitable way, for example, sewing, gluing, etc.

To place the advertising support in a stable position to be viewed, during a football game or any other sporting event or similar, different types of fixing bases 3 are provided on the ground, or in the ground, some of which are represented in FIGS. 5a and 5b.

FIG. 5a shows a fixing base 31 with a tubular part 32, which defines in its interior a cavity 30 appropriate for receiving the free end of one of the uprights 11, 12 of the frame 1 with its corresponding terminal 16.

As can be seen, in this embodiment the base 31 has a configuration similar to that of a pick, suitable for being driven into the ground, for example in a football pitch; it is closed in its lower part, to avoid it filling with earth when driven, and it can be removed when the support is removed from the pitch at the end of the game.

FIG. 5b shows, as an alternative embodiment, a fixing base 33, which has a tubular part 34 which defines the cavity 30 appropriate for receiving the free end of an upright of the frame 1, and a plate 35, which is welded or fixed in any other way to the tubular part 34, and has an drainage orifice 36.

Rods or cartouches 37, or other reinforcement elements between the tubular part 34 and the plate 35, may also be provided. The tubular part may both be of PVC and of steel or of other materials.

These fixing bases 33 are designed to be permanently placed in the ground: boxes are prepared in the ground, a base 33 is placed in each box, so that the upper edge remains approximately 5 cm below the level of the grass and the concrete box is filled; finally, the concrete is covered with a layer of earth to again sow the grass.

Another type of fixing bases which can be used for the advertising support described are bases (not represented), designed to simply rest on a surface; they also have a cavity to house the uprights of the advertising support, but they include a body or block with a not very large size but of considerable weight, for example, approximately 20 kg, to avoid them from moving when the support is impacted.

These bases enable the support to also be placed on hard surfaces, such as athletic tracks or similar.

It is possible to associate a cap 4 to the fixing bases, optionally equipped with a trim 5, which is also shown in FIGS. 5a and 5b, in order to avoid it from filling with water, dirt etc. when the advertising support is removed. The trim may have, for example, artificial grass of a suitable colour to easily locate the fixing base when the cap 4 is placed.

It is possible to use one or another of the fixing bases described, depending on the place or type of ground wherein one wants to install the advertising support, if the bases are going to be fixed or are going to be removed and placed with the advertising support, etc.

Despite the fact that specific embodiments of the invention have been described, the person skilled in the art can modify elements and details of the device depending on the requirements of each case without departing from the scope of protection defined by the attached claims. In particular, the present invention includes all possible combinations of particular and preferred embodiments indicated herein.

The invention claimed is:

1. An advertising support for sports and similar events, which comprises a frame with the general shape of a U with two uprights and a crossmember, plus a printed sheet which is secured to the frame; wherein the frame comprises a solid core and a tubular sleeve covering the core, the sleeve comprising at least a natural or synthetic rubber; wherein the core of the frame is of a plastic material which has bakelite as the predominant component; and wherein the material of the core of the frame further comprises melamine resin, epoxy resin, polybutadiene and polyesters.

* * * * *